United States Patent
Mukaida et al.

(10) Patent No.: US 6,209,885 B1
(45) Date of Patent: Apr. 3, 2001

(54) BOOT FOR UNIVERSAL JOINT

(75) Inventors: Toshihiro Mukaida, Kakegawa; Selya Umeno, Kikugawa, both of (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 09/296,261

(22) Filed: Apr. 22, 1999

(30) Foreign Application Priority Data

Apr. 23, 1998 (JP) .................................................. 10-112907
Apr. 13, 1999 (JP) .................................................. 11-104834

(51) Int. Cl.$^7$ .................................................. F16J 15/52
(52) U.S. Cl. .................................................. 277/634; 277/636
(58) Field of Search .................................................. 277/634, 635, 277/636; 403/134

(56) References Cited

U.S. PATENT DOCUMENTS

| | | | |
|---|---|---|---|
| 5,236,394 | * 8/1993 | Collins et al. | 277/636 X |
| 5,599,029 | * 2/1997 | Umeno | 277/636 |
| 5,645,286 | * 7/1997 | Katoh | 277/636 |
| 5,672,113 | * 9/1997 | Tomogami et al. | 277/636 X |
| 5,765,837 | * 6/1998 | Schwarlzer | 277/636 |
| 5,879,238 | * 3/1999 | Breheret | 277/636 X |

FOREIGN PATENT DOCUMENTS

| | | |
|---|---|---|
| 2287075 | 9/1995 | (GB) . |
| 7-55000 | 2/1995 | (JP) . |
| 2525619 | 11/1996 | (JP) . |

* cited by examiner

Primary Examiner—Terry Lee Melius
Assistant Examiner—William L. Miller
(74) Attorney, Agent, or Firm—Jacobson, Price, Holman & Stern, PLLC

(57) ABSTRACT

In a boot for a universal joint in which a fitting portion is installed at one end side in an axial direction of a bellows portion on an outer ring portion of the universal joint by the clamp and a relief portion is provided between the bellows portion and the fitting portion on purpose to lower interference between each of the bellows and to relieve a contact of the bellows portion against the shaft in the case when being bent at a sharp angle. This prevents the relief portion from interfering with the tightly clamping portion of the clamp. The relief portion is designed to be arranged apart from the clamp by providing the spacer portion with the predetermined length in the axial direction between the fitting portion and the relief portion.

7 Claims, 8 Drawing Sheets

BOOT FOR UNIVERSAL JOINT

BACKGROUND OF THE INVENTION

1. Technical Field of the Invention

This invention relates to boots for universal joints used in order to cover and protect an operation portion of the universal joints. More particularly, this invention relates to boots for universal joints having an excellent durability and also having an excellent impact strength. Still more particularly, this invention relates to boots for universal joints made of thermoplastic elastomer.

2. Related Art

Heretofore, it is well known, as shown in FIG. 8, that a boot for a universal joint made of resin is designed to have an annular fitting portion 52 on the side of a relatively large diameter in the axial direction (hereinafter it is called large-diameter side) of a bellows portion 51 and also to have another annular fitting portion 53 on the side of a relatively small diameter in the axial direction (hereinafter it is called small-diameter side) of the bellows portion 51. The fitting portion 52 of the large-diameter side is fixed on a periphery of an outer ring portion 54 of the universal joint, and the fitting portion 53 of the small-diameter side is fixed on an outer periphery of a shaft 55 as shown in FIG. 8, thereby to cover and protect the operation portion of the universal joint. There is an opening portion 60 in the radially inner side of the outer ring portion 54. Bellows usually have several mountainous and ravine shape portions, namely crest 58 and trough 57 portions. Moreover, a frustoconical shape enlarged portion 56 having an approximately frustoconical shape in cross section is provided in the vicinity of the large-diameter-side portion, in order to lower a contact pressure between each adjacent mountainous or slanting portion 59 shape portion at the time when the bellows is bent in a sharp angle, and to also relieve bellows portion 51 from contact with the shaft 55 or the opening portion 60 as well. The enlarged portion 56 is placed between the bellows portion 51 and the fitting portion 52 of the larger-diameter side (Japanese Registered Patent 2525619).

As shown in FIG. 9, the inclination angle between the slanting portions 59 of the bellows extending from the trough portions to the small-diameter side and the axial direction of the boots, is smaller than that of the angle between the enlarged portion 4 exdending from large-diameter side to small-diameter side and the axial direction of the boots. When the boot is bent, the force "f" in the direction of the arrow is added, and the enlarged (frustoconical) portion 56 is forced to move toward the arrow direction "d", to prevent the bellows portion 51 from interfering with the opening portion 60.

Since such kind of boots made of resin are excellent in durability, functionality and recycling ability, when compared to conventional boots made of rubber, so that the resin boots have become widely used in recent years. However, due to the higher stiffness of the resin boots compared to the boots made of rubber, the following inconveniences have resulted.

That is to say, a fitting member is used when the fitting portion 52 of the large-diameter side of the boot made of resin is fixed on the outer ring portion 54 of the universal joint. A clamp is generally used as the fitting member. In this case, the clamp having higher stiffness than that of a conventional clamp for rubber boots has been used, because of the higher stiffness of the resin boots. Caulking type clamps having higher stiffness are usually used for resin boots.

The caulking type clamp is usually provided with a tightly-clamping portion (not shown) in a specific area of its circumference, and the tightly-clamping portion protrudes relatively largely from the outer peripheral surface of the band portion of the clamp, toward the radially outwardly direction.

Therefore, as shown in FIG. 8, crest portion 58 or slanting portion 59 of the first mountainous portion or annular enlarged portion 56 on the large-diameter side of the bellows 51 is prone to bend toward the clamping side and interfere with the tightly-clamping portion or boot's band, when the boot is bent sharply. With this repeating interference, the annular enlarged portion 56 and the bellows portion 51 are prone to be damaged.

There is also a shortage in physical strength against impact in the vicinity of the enlarged portion. When impact is added from outside of the boot in the vicinity of the enlarged portion as shown by the arrow "g" or "g'" in FIG. 9. The portion around the enlarged portion or the slanting portion 59 in FIG. 9 is impinged to the outer ring portion 54, to often cause damage in the boot.

In view of the above-mentioned problems, an object of the present invention is to provide bellows type boots for the universal joint, which does not interfere with a tightly-clamping portion of a boot clamping means, having an excellent durability, and also having an excellent impact strength.

SUMMARY OF THE INVENTION

In order to achieve the above-described object, the boots for universal joints of the present invention comprise a bellows having a larger-diameter portion at an axially end portion thereof, a smaller-diameter portion at another axially end portion thereof, a bellows portion placed between said larger-diameter portion and said smaller-diameter portion, an annular fitting (clamped) portion, which is mounted and fitted on the outer periphery of the universal joints by a clamp means, an annular relief portion placed between said bellows portion and said clamped portion, and an annular spacer portion having a specific length between said clamped portion and said annular relief portion. The annular relief portion is preferably directly and consecutively connected to the slanting portion of the trough portion in the bellows. The annular relief portion has preferably an arcuate in cross section having a predetermined curvature.

The object of the present invention can be also achieved by the following construction. The boot according to the present invention comprises a bellows, an annular fitting portion, an annular relief portion and an annular spacer portion. Said spacer portion comprises an annular or tubler shape thrust portion having a side wall on its larger-diameter side, said side wall being higher than the thickness of a clamping band, an annular rising-up portion molded consecutively with said annular or tubular thrust portion in one body and placed in a substantially axial direction of said thrust portion from an outer peripheral portion of said thrust portion, and an enlarged portion molded consecutively with said rising portion in one body and placed in an obliquely outer direction or a radially outer direction from an axially large-diameter-side end portion of said rising-up portion.

Especially, the angle between the direction of said enlarged portion and the radial direction of said boot, is preferably smaller than the angle between the direction of the slanting portion of the bellows extending from said trough to the smaller-diameter-side and a radially outwardly direction of said boots.

Furthermore, a larger-diameter-side outer peripheral corner in the radially outwardly portion of said thrust portion is preferably chamfered.

The boots according to the invention provided with the spacer portion having a predetermined length and being placed between the fitting portion and the relief portion so that the relief portion can be placed more apart from the clamping portion by the length of this spacer portion.

Therefore, even when the shaft is bent sharply, the relief portion does not frequently reach to the tightly-clamping portion of the clamp, thereby preventing the relief portion from interfering with the tightly-clamping portion. Moreover, it is more preferable to set the diameter of the spacer portion to a smaller diameter than the diameter of the relief portion, so that the spacer portion can not newly interfere with the tightly-clamping portion in place of the relief portion.

The spacer portion comprises the thrust portion having a higher side wall of the groove-like recess for fitting the clamp provided on the peripheral surface of the fitting portion; the rising-up portion molded integrally with the tubular thrust portion from the end of the periphery of the thrust portion to the large-diameter side; and the thrust portion molded integrally with the rising-up portion from the axial end of the rising-up portion to the slantingly outward direction or the radially outward direction.

According to this structure, when the boot is bent, at a first step, both the enlarged portion and the relief portion concurrently slant toward the clamping portion about around the large-diameter-side axial end portion of the rising-up portion and at a second step, the rising-up portion, the enlarged portion and the relief portion concurrently slant toward the clamping portion about around the outer periphery portion of the thrust portion. The force added on the boots is dispersed by such deformation mentioned above, and the slanting angle of each part can be relatively decreased respectively, thereby it is possible to avoid interference of the relief portion with the tightly-clamping portion.

According to the present invention, the relief portion has an arcuate or half round shape in cross section, so that the arcuate shape can open and close somewhat easily like a scissors with expansion and contraction of the bellows portion. The arcuate portion also has a half round shape so that it can absorb, to some degree, the stress added to the bellows. Thereby the relief portion acts like a buffer to absorb deformation of the boot when the boot is bent.

The boots of the present invention have a chamfered portion in a larger-diameter-side outer peripheral corner of the radially outward portion of said tubular thrust portion, in order to obtain boots having an anti-impact strength.

DESCRIPTION OF THE PREFERRED EMBODIMENTS

Preferred embodiments according to the present invention will be more precisely described with reference to the drawings. The total length of the boot of each embodiment is about 125 mm and an inner diameter of the large-diameter-side fitting portion is about 90 mm. An inner diameter of the large-diameter-side fitting portion is about 30 mm.

First Embodiment

Figure 1:
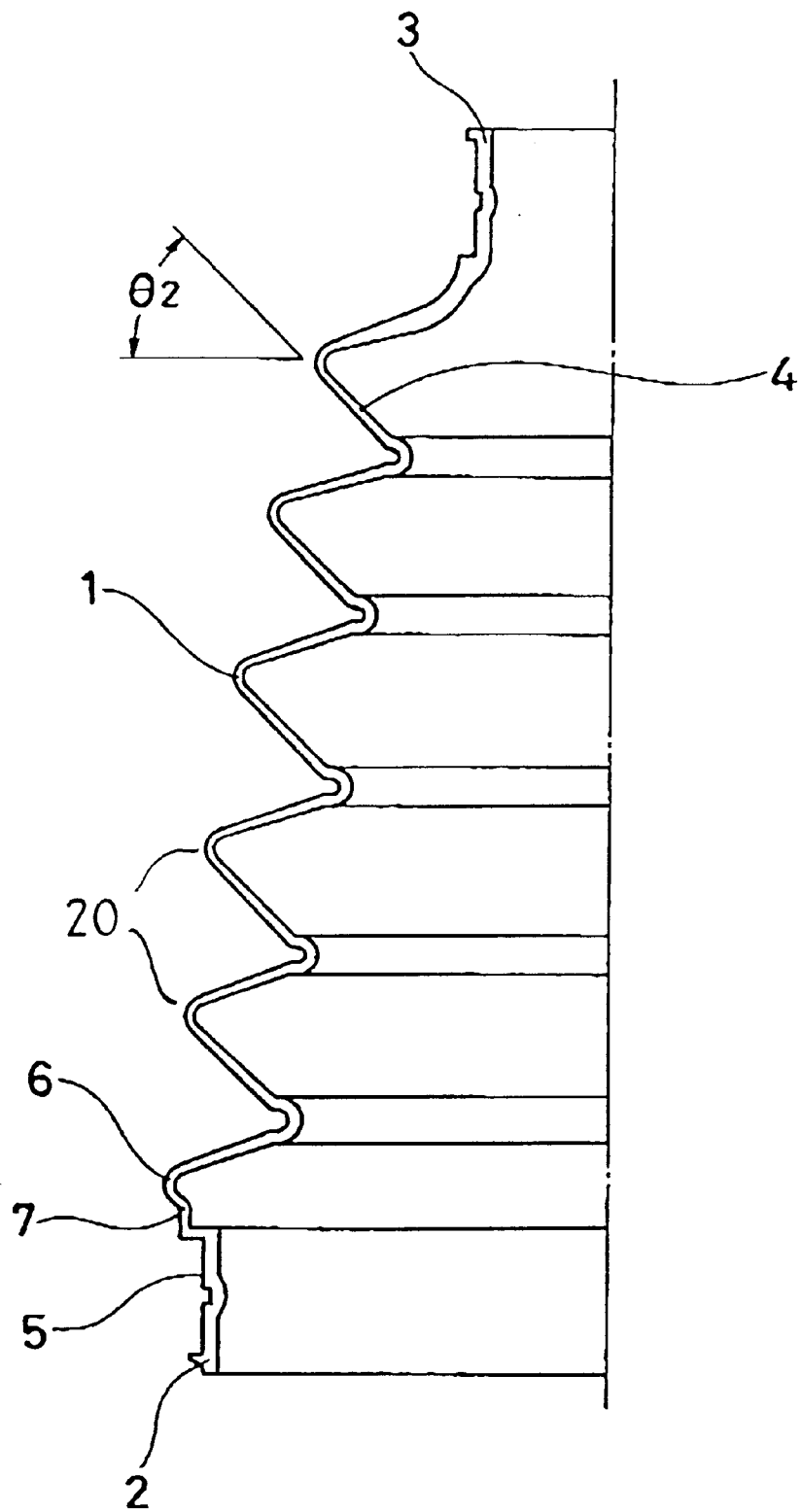
FIG. 1 is a half-cut cross sectional view showing a boot according to a first embodiment of the present invention.
Figure 2:
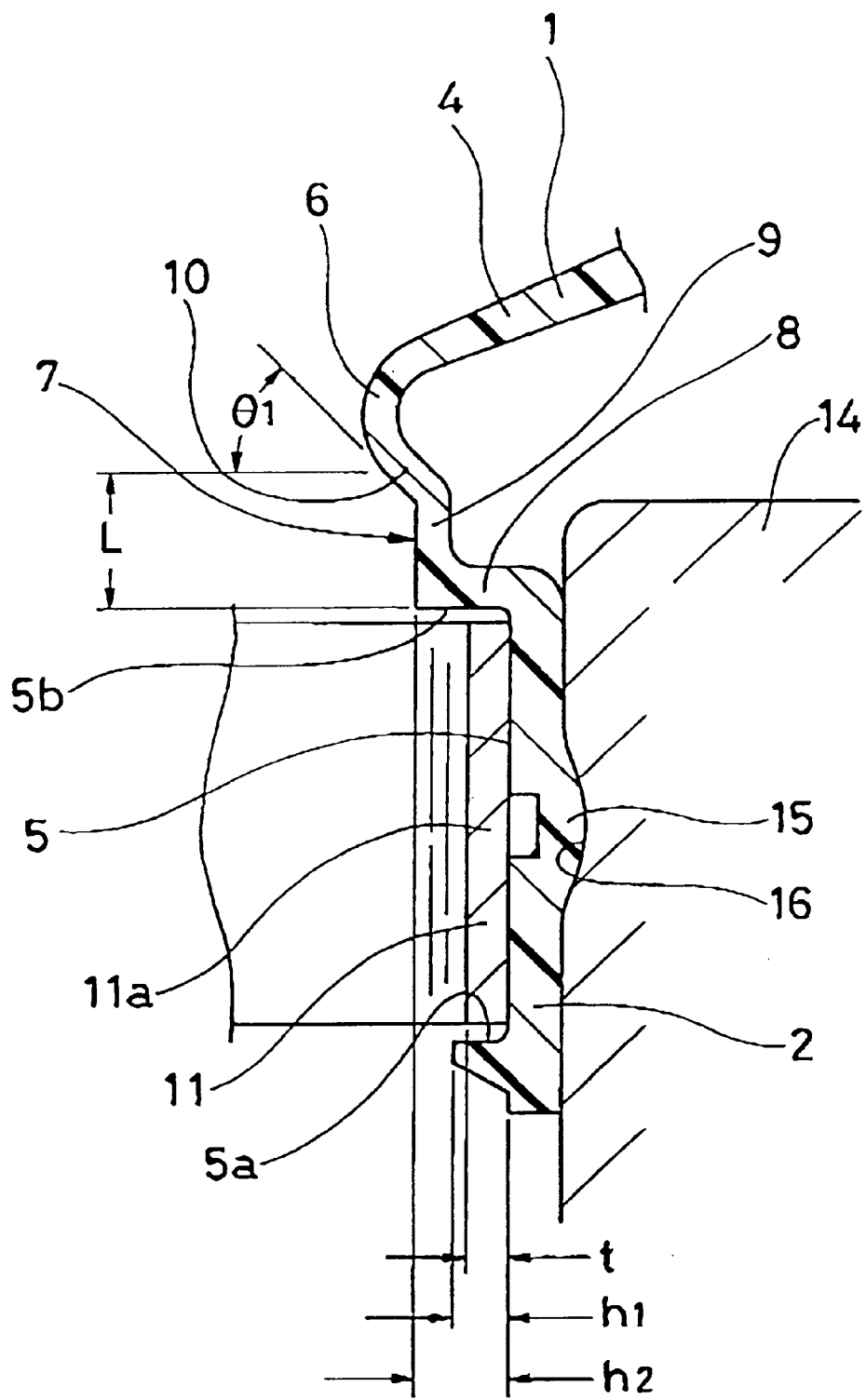
FIG. 2 is an enlarged sectional view showing a main portion mounted on an outer periphery of a universal joint of the present invention.

FIG. 1 is a half-cut cross sectional view of a boot for a universal joint according to the first embodiment, and FIG. 2 is an enlarged cross sectional view showing a main portion mounted on an outer periphery of a universal joint.

As is shown in FIG. 1, the boot comprises a bellows portion 1 having a plurality of mountainous portions 20, which includes ravine (valley or trough) portions and mountainous (crest or peak) portions. The ravine and crest are arranged alternately. An annular fitting portion 2 of a relatively large diameter having a cylindrical shape is provided on one side of this bellows portion 1 in an axial direction (a bottom side of the drawing, hereinafter referred to as a large-diameter side), and an annular fitting portion 3 of a relatively small diameter is provided on the other side of the bellows in an axial direction (a top side of the drawing, hereinafter referred to as a small-diameter side) The bellows portion 1 is formed by putting a plurality of bellows 4 in the axial direction, and the bellows 4 are formed so as to gradually reduce in diameter from the fitting portion 2 of the large-diameter side to the fitting portion 3 of the small-diameter side. A groove-like recess 5 for fitting a clamp having an annular shape is provided on a peripheral surface of the large-diameter-side fitting portion 2. The boot of the present invention made of resin is formed in one body by blow molding or the like.

An annular relief portion 6 having an approximately arcuate or semicircle shape in cross section is provided between the bellows portion 1 and the fitting portion 2 of the large-diameter side, and an annular spacer portion 7 with a predetermined length L in the axial direction is provided between this relief portion 6 and the fitting portion 2 of the large-diameter side.

Since the relief portion has an arcuate or half round shape in cross section, so that the arcuate shape can open and close somewhat easily like a scissors with expansion and contraction of the bellows portion. The arcuate portion also has a half round shape so that it can absorb, to some degree, the stress added to the bellows. Thereby the relief portion acts like a buffer portion to absorb deformation of the boots when the boots are bent.

The cross sectional shape of the relief portion is preferably substantially symmetrical with respect to a line which is perpendicular to the axis of the boot and passes at the summit (or radially outermost point) of the relief portion.

This spacer portion 7 is constituted as follows More specifically, as shown in FIG. 2, an annular or tubular thrust portion 8 having a side wall (referred to as a side wall of the large-diameter side) 5b having a height $h_2$ higher than the thickness of a band 11a of the clamp means 11. The band 11a is placed in a groove-like recess 5 provided on a peripheral surface of the large-diameter side of the fitting portion 2. And the rising-up portion 9 is formed, consecutively and integrally with the thrust portion 8, from the end of the radially outer portion of this thrust portion 8 toward the small-diameter side in the bellows axial direction. The enlarged portion 10 is formed, consecutively integrally with the annular rising-up portion 9 in an outwardly slanting direction or frustoconicallly, from the small-diameter-side end portion of the rising-up portion 9 toward the small-diameter side, and the enlarged portion 10 is consecutively connected to the relief portion 6 having approximately an arcuate shape in cross section.

The term "frustoconical" means inner and outer peripheral diameter gradually increasing in the direction from the large-diameter side to small-diameter side.

The height $h_2$ of the side wall 5b of the small-diameter side in the groove-like recess 5 is set in the range of from about 1.5 times to about 2.0 times the thickness "t" of the band portion 11a of the clamp 11. The height $h_2$ is preferably in the range of about, for example, 1 mm to 3 mm in actual size. The thrust portion 8 is formed into an annular shape or a bull's-eye like shape from the end portion of the small-diameter side of the fitting portion 2 toward the radially outward direction. The tubular thrust portion 8 has a substantially flat surface on the side of the small-diameter side, and has also a substantially flat surface on the side of the large-diameter side. These two flat surfaces are placed relative to each other in a parallel or nearly parallel-like manner. The preferable thickness between these two flat surfaces is in the range of about, for example, 0.9 mm to 1.2 mm in actual size.

The height $h_1$ is a height of the large-diameter side in the groove-like recess 5.

The length $h_2$ in the radial direction of the thrust portion 8 is preferably set to about 2 mm or more in actual size. The length of the annular rising-up portion 9 from the side wall 5b to the small-diameter-side end of the rising up portion is preferably, for example, about 1 mm to about 3 mm in actual size. The thickness of the rising-up portion is preferably for example, about 0.7 mm to about 1.1 mm in actual size.

Since the height of the side wall of the bellows side in the groove-like recess for fitting the clamp is set higher than the thickness of the clamp band, and also the enlarged portion is formed to extend toward the slantingly outward direction or the radially outward direction, the relief portion is considerably outwardly placed in the radial direction. Therefore, even when the relief portion deforms in the compression side when the boot is bent sharply, the relief portion is not frequently met with the tightly-clamping portion of the clamp, thereby it is possible to avoid interference of the relief portion with the tightly-clamping portion.

The rising-up portion 9 is formed into an annular shape or a cylindrical shape and has a pair of specific circumferential surfaces parallel or nearly parallel relative to each other. The enlarged portion 10 is formed into a frustoconical or a tapered shape. The shape in a cross section of the enlarged portion 10 is also formed into a nearly straight-line as is shown in FIG. 2.

The inclination angle $\theta_1$ (in FIG. 2) of the enlarged portion 10 in a free state is set to smaller than an inclination angle $\theta_2$ (in FIG. 1) of the slanting portion of the bellows extending from each ravine portion of the bellows portion 1 to the small diameter side. The thickness of the enlarged portion 10 is preferably, for example, from about 0.7 mm to about 1.1 mm in actual size. The length of the enlarged portion 10 from the small-diameter side of the rising-up portion to the small-diameter-side of the enlarged portion is preferably, for example, about 0.5 mm to 2 mm in actual size. The relief portion 6 has nearly an arcuate or semicircular shape in cross section. The radius of the arcuate shape of the relief portion 6 is preferably set to about 1 mm or more in actual size, preferably about 1.5 mm to 3 mm. The thickness of the relief portion 6 is preferably, for example, about 0.7 mm to 1.1 mm in actual size.

An engagement projection portion 15 for positioning the fitting portion 2 of the large diameter to the outer ring portion 14 of the universal joint is provided in the vicinity of a center of the inner circumferential surface of the fitting portion 2 of the large diameter. The engagement projection portion 15 is engaged with an engagement recess portion 16 provided on the peripheral surface of the outer ring portion 14, thereby the fitting portion 2 of the large-diameter side is predeterminedly positioned to the outer ring portion 14.

The boot is formed integrally from synthetic resin such as TPE or the like in one body by blow molding or the like.

The boot for the universal joint having the above-described constitution is fixed, at the fitting portion 2 of the large-diameter side, on the outer periphery of ring portion 14 of the universal joint by the caulking type clamp 11. The boot is also fixed, in the fitting portion 3 of the small-diameter side, on the outer periphery of the shaft (not shown), thereby covering and protecting the operation portion of the universal joint. The following operative effect described below can be obtained by the above-described construction. Moreover, the caulking type clamp 11 comprises the band portion 11a and a tightly-clamping portion (not shown) for tightening this band portion 11a. And this tightly-clamping portion is largely protruded in a certain point of a circumference of the band portion 11a, from band portion 11a toward the radially outwardly direction.

That is, first of all, since the spacer portion 7 having a predetermined length L in the axial direction is provided at the place between the large-diameter-side fitting portion 2 and the relief portion 6, the relief portion 6 is placed far away, with the length L of this spacer portion, from the small-diameter side of the clamp portion. Therefore, even when the boot is bent sharply in an angle and the relief portion 6 slants in the compression side, the relief portion can not frequently reach to the tightly-clamping portion of the clamp means 11, thereby it is possible to prevent the relief portion 6 or the bellows portion 1 connected to the relief portion 6 from interference with the tightly-clamping portion.

The length L is preferably set in the range of about 2 mm to about 8 mm more preferably about 2 mm to 6 mm.

According to the boot having the above-described construction, when a load is added to the boot to slant the enlarged portion 6 and the mountainous portion 20 of the bellows as well as the relief portion 10 toward the large-diameter side, the spacer portion 7 operates as follows.

That is, the inclination angle $\theta_1$ of the enlarged portion 10 is set to smaller than the inclination angle $\theta_2$ of the slanting portion of the bellows 4 extending from each ravine portion of the bellows portion 1 to the small-diameter side, in the free state, as described above, so that the flexibility at around the spacer portion 7 is relatively larger than the flexibility of the bellows portion 1. The enlarged portion is inclined in a radially outward direction because the angle $\theta_1$ is smaller than $\theta_2$. When a force is added on the boot to bend the boot sharply, as a first step, the enlarged portion 10 and the relief portion 6 are slanted concurrently and integrally, about around the small-diameter-side end portion of the rising-up portion 9, radially outward of the bellows in the compression side. At this time, the rising-up portion 9 is relatively higher in stiffness, thereby hardly deforming.

As the second step, the rising-up portion 9, the enlarged portion 10 and the relief portion 6 are slanted concurrently and integrally, about around the large-diameter-side portion of the rising-up portion 9, toward the radially outward direction, when the bending angle is increased more than that in the first step described above. At this time, since the stress added to the boot is relieved or dispersed or decreased to a certain extent through the first step and the second step deformation in the boot, the load acting on the thrust portion 8 is also relieved or decreased. Thereby, the thrust portion 8 is eventually hardly deformed.

Therefore, the thrust portion 8 is hardly deformed according to the boot of the above-described construction, even in the case when the boot is bent sharply at an angle, so that the thrust portion 8 can not interfere with the tightly-clamping portion (not shown) of the clamp 11; and that all three elements of the rising-up portion 9 supported by this thrust portion 8, the enlarged portion 10 and the relief portion 6 can not interfere with the tightly-clamping portion (not shown) of the clamp 11. Therefore, it is possible to prevent these three portions and the bellows portion 1 connected with these portions from interfering with the tightly-clamping portion (not shown), thereby preventing the boot from damage.

Moreover, the height $h_2$ of the side wall $5b$ of the small-diameter side on the groove-like recess 5 for fitting the clamp means 11 is set higher than the height "t" of the band of the clamp means. The enlarged portion 10 is formed to enlarge in its diameter toward the radially and outwardly slanting direction.

According to this construction, the relief portion 6 is placed in a manner that the relief potion 6 is far from the large-diameter side of the fitting portion 2, in a radially outward direction. Therefore, even when the relief portion 6 slants toward the clamp 11 at the time when the boot is bent sharply, the relief portion 6 is not frequently met with the tightly-clamping portion in the clamp, thereby it is possible to prevent the relief portion 6 from interfering with the tightly-clamping portion and from being damaged.

Second Embodiment

Figure 3:
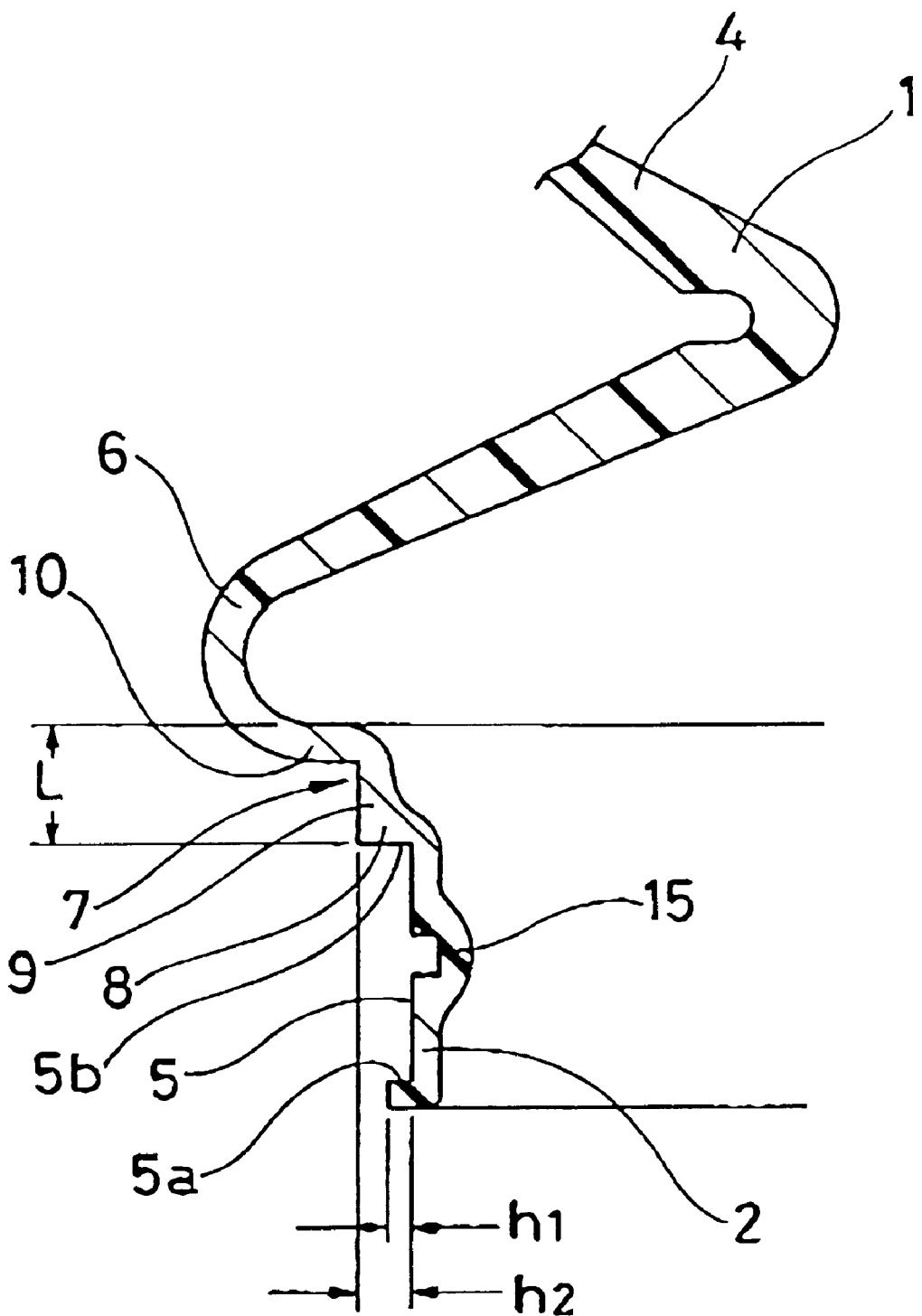
FIG. 3 is a cross sectional view showing a main portion of a boot according to a second embodiment of the present invention.

FIG. 3 shows a cross sectional view of a main portion of a boot for a universal joint according to the second embodiment. The reference numerals are the same as in FIGS. 1 and 2, except some numerals.

The boot comprises a bellows portion 1 where a plurality of (ravine or trough) portions and mountainous (peak or crest or ridge) portions are arranged alternately and an annular fitting portion 2 of a relatively large-diameter side which shows a cylindrical shape on one side in an axial direction of the bellows portion 1 (a bottom side on the drawing, hereinafter referred to as a large-diameter side), and an annular fitting portion (not shown) on the side of a relatively small diameter is provided on the other side in an axial direction opposite to the large-diameter side as shown in FIG. 3 (a top side on the drawing, hereinafter referred to as a small-diameter side). The bellows portion 1 is constituted by a plurality of the bellows 4 arranged in the axial direction, and the bellows 4 is formed so as to gradually reduce in diameter from the large-diameter-side fitting portion 2 to the small-diameter-side fitting portion (not shown). The groove-like recess 5 for fitting the clamp (not shown) having an annular shape is provided on the peripheral surface of the fitting portion 2 of the large-diameter side.

An annular relief portion 6 having an approximately arcuate shape in cross section is provided between the bellows portion 1 and the large-diameter-side fitting portion 2, and an annular spacer portion 7 having a predetermined length L in the axial direction of the boot is provided between the relief portion 6 and the large-diameter-side fitting portion 2.

This spacer portion 7 is constituted as follows.

An annular or tubular thrust portion 8 with a side wall (referred to as a side wall of the large-diameter side) $5b$ is shown in FIG. 3. The height $h_2$ of the side wall is higher than the thickness of a band of a clamp (not shown, but refer to FIG. 2). The rising-up portion 9 is molded, integrally with the thrust portion 8, from the peripheral end portion of the thrust portion 8 to the small-diameter side in the axial direction, and the enlarged portion 10 is molded, integrally with the rising-up portion 9, from the small-diameter-side end portion of the rising-up portion 9, in a substantially radially outward direction. The enlarged portion 10 is consecutively connected to the relief portion 6 having an approximately arcuate or semicircle shape in cross section.

The cross sectional shape of the relief portion is preferably substantially symmetrical with respect to a line which is perpendicular to the axis of the boot and passes through the summit (or radially outermost point) of the relief portion.

The height $h_2$ of the side wall $5b$ of the small-diameter side of the groove-like recess 5 is set to about 1.5 times to about 2.0 times a thickness of a band of the clamp (not shown). The thrust portion 8 is formed into an annular shape or a bull's-eye like shape, in a manner to project from the end of the small diameter of the large-diameter-side fitting portion 2, toward the radially outward direction. The length in the radial direction of the thrust portion 8 is set at about 2 mm or more in actual size.

The rising-up portion 9 is formed into an annular shape or a cylindrical shape. The length in the axial direction of the rising-up portion 9 is set to about 1 mm or more in actual size. The enlarged portion 10 is formed into an annular shape or a bull's-eye like shape, and is formed into an approximately straight-line shape in cross section.

A radius of the relief portion 6 having an approximately arcuate shape in cross section is set to the value similar to the first embodiment. A thickness and length of each portion are also similar to the first embodiment.

An engagement projection portion 15 for positioning the fitting portion 2 of the large diameter with respect to the outer ring portion (not shown) of the universal joint is provided in the vicinity of a center of the axial direction of the inner peripheral surface of the fitting portion 2 of the large diameter. The engagement projection portion 15 is engaged with an engagement recess portion (not shown) provided on the peripheral surface of the outer ring portion (not shown), thereby the fitting portion 2 of the large diameter being positioned to the outer ring portion.

The boot is formed integrally from synthetic resin such as TPE or the like, in one body by blow molding or the like.

The boot for universal joint having the above-described construction is fixed to the universal joint by fitting the large-diameter-side fitting portion 2 on the outer periphery of the outer ring portion (not shown) of the universal joint by using the caulking type clamp, and also by fixing the small-diameter-side fitting portion on the outer periphery of the shaft (not shown), to cover and to protect the operation portion (not shown) of the universal joint. The following effect can be realized by providing the boot with the above-described construction. Moreover, the caulking type clamp comprises the band portion and the tightly-clamping portion (referred to as a clamping portion, not shown) for tightening this band portion. The tightly-clamping portion is largely protruded in a position on a circumference of the band portion from the band portion toward the radially outward direction as described in the first embodiment.

That is to say, first of all, since the spacer portion 7 having a predetermined length L in the axial direction is provided between the large-diameter-side fitting portion 2 and the relief portion 6, the relief portion is arranged more remotely than the clamp by the length L of the spacer portion. Therefore, even when the relief portion 6 slants in the compression side (or clamp 11 side in FIG. 2) at the time when the boot 1 is bent, the relief portion 6 has not frequently reached to the tightly-clamping portion (not shown) of the clamp (11 in FIG. 2), thereby it is possible to prevent the relief portion 6 from interfering with the tightly-clamping portion (not shown). Consequently, it is possible to prevent the relief portion 6 or the mountainous bellows portion 1 from interfering with the tightly clamping portion and from being damaged.

The length L is preferably set in the range of about 2 mm to about 8 mm, more preferably about 2 mm to 6 mm.

According to the boot of the above-described construction, when a load is added on the boot to slant the spacer portion 7 toward the clamp side, the spacer portion 7 operates as follows That is, since the enlarged portion 10 is formed in a manner protrude to substantially in a radially outward direction so as to secure the enlarged portion 10 to have a relatively large length in the radial direction, thereby when the boot is bent, as a first step, the enlarged portion 10 and the relief portion 6 are concurrently and integrally slanted toward the compression side (clamp side) about around the small-diameter-side end portion of the rising-up portion 9. At this time, the rising-up portion 9 is set relatively higher in stiffness, thereby hardly deforming.

As the second step, when the bending angle is increased more than that in the first step described above, this rising-up portion 9, the enlarged portion 10 and the relief portion 6 are concurrently and integrally slanted, in the radially outward direction, about around the large-diameter-side end portion of the rising-up portion 9. At this time, the stress added to the boot is dispersed and decreased through the first step and the second step, thereby the load acting on the thrust portion 8 is also decreased. Therefore, the thrust portion 8 is eventually hardly deformed.

Therefore, the thrust portion 8 is hardly deformed in the case where the boot is bent sharply, due to the above-described constitution, so that the thrust portion 8 can not interfere with the tightly-clamping portion (not shown) of the clamp (11 in FIG. 2), and the rising-up portion 9 supported by this thrust portion 8, the enlarged portion 10 and the relief portion ID can not interfere with the tightly-clamping portion of the clamp. Therefore, it is possible to prevent these portions and the mountainous portions of the bellows portion 1 from interfering with the tightly-clamping portion.

In addition, since the height $h_2$ of the side wall 5b of the small-diameter side in the groove-like recess 5 for fitting the clamp 11 is set higher than the thickness of the band 11a of the clamping means 11, and also the enlarged portion 10 is extended in the radially outward direction, the relief portion 6 is arranged in the considerably radially outward direction with respect to the large-diameter-side fitting portion 2. The relief portion 6 is located considerably far from both the large-diameter-side fitting portion and the clamp portion which clamps the fitting portion. Therefore, even when the relief portion 6 slants at the time the boot is bent sharply, the relief portion 6 can not be frequently met with the tightly-clamping portion (not shown) of the clamp 11, thereby it is possible to prevent the relief portion 6 from interfering with the tightly-clamping portion and from being damaged.

In addition to the shapes described in the first and second embodiments described above, the enlarged portion 10 may also take other shapes described below.

Third Embodiment

Figure 4:
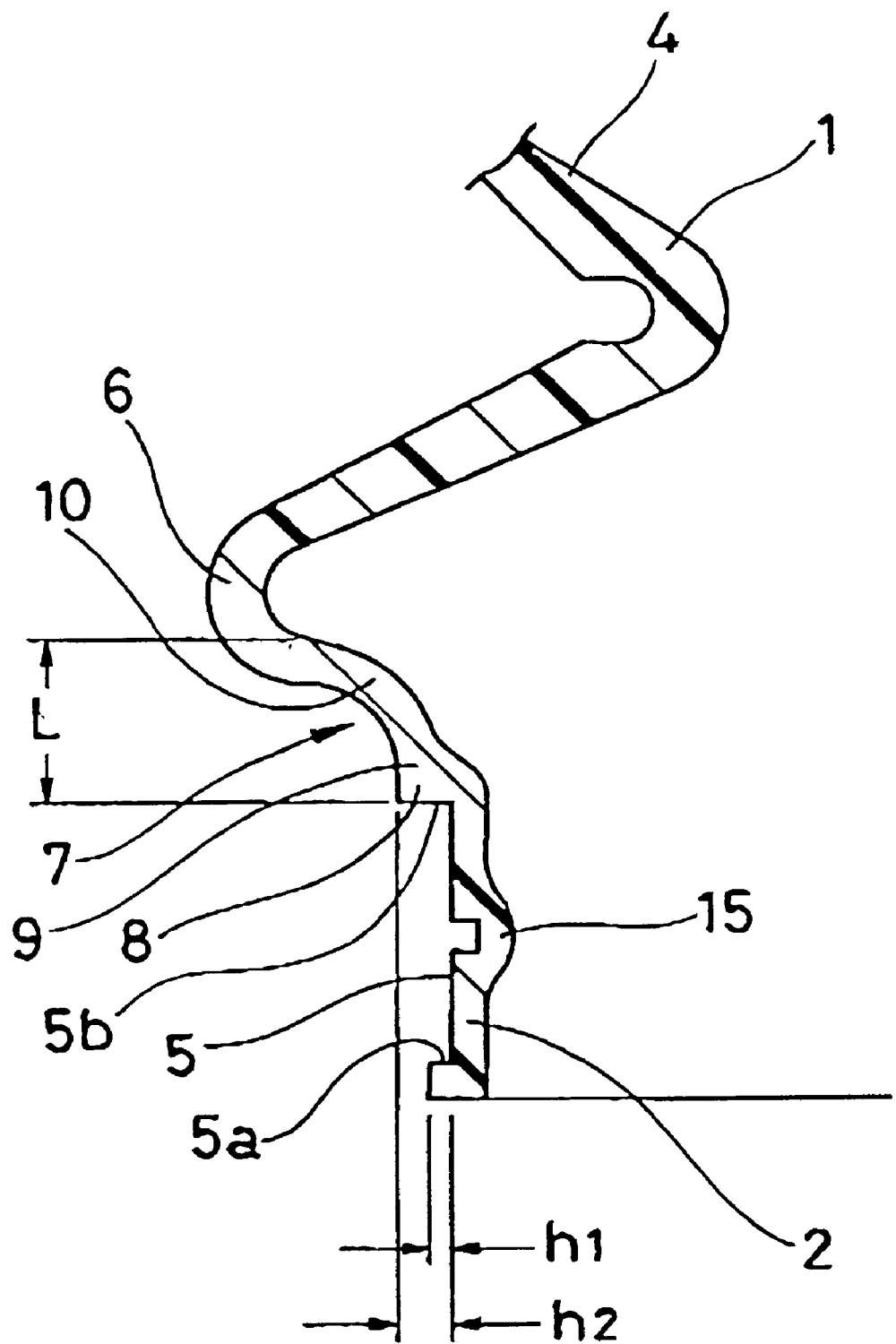
FIG. 4 is a cross sectional view showing a main portion of a boot according to a third embodiment of the present invention.

As is shown in FIG. 4, reference numerals are the same in FIGS. 1, 2 and 3. In the spacer portion 7, the enlarged portion 10 is molded, consecutively to and integrally with the rising-up portion 9, into a cross-sectionally tapered-shape in a slantingly radially outward direction from the small-diameter-side end of the rising-up portion 9. A cross sectional shape of this enlarged portion 10 is formed into an approximately arcuate (convex) shape as shown in FIG. 4. The convex portion of the enlarged portion 10 is directed radially inward of the boot as shown in FIG. 4. The arcuate portion of the annular relief portion 6 is consecutively connected to the enlarged portion 10.

Since the enlarged portion extends radially outwardly in an arcuate direction, and the relief portion is placed apart from the side wall 6 by the length L, when the boot is bent, as a first step, the enlarged portion 10 and the relief portion 6 are concurrently and integrally slanted toward the compression side (clamp side) around the small-diameter-side end portion of the rising-up portion 9. At this time, the rising-up portion 9 is set relatively higher in stiffness, thereby hardly deform.

As the second step, when the bending angle is increased more than that in the first step described above, this rising-up portion 9, the enlarged portion 10 and the relief portion 6 are concurrently and integrally slanted, in the radially outward direction, around the large-diameter-side end portion of the rising-up portion 9. At this time, the stress added to the boot is dispersed and decreased through the first step and the second step, thereby the load acting on the thrust portion 8 is also decreased. Therefore, the thrust portion 8 is eventually hardly deformed.

Therefore, the thrust portion 8 is hardly deformed in the case where the boot is bent sharply, due to the above-described construction, so that the thrust portion 8 can not interfere with the tightly-clamping portion (not shown) of the clamp (11 in FIG. 2), and the rising-up portion 9 supported by this thrust portion 8, the enlarged portion 10 and the relief portion 6 can not interfere with the tightly-clamping portion of the clamp. Therefore, it is possible to prevent these portions and the mountainous portions of the bellows portion 1 from interfering with the tightly-clamping portion.

Fourth Embodiment

Figure 5:
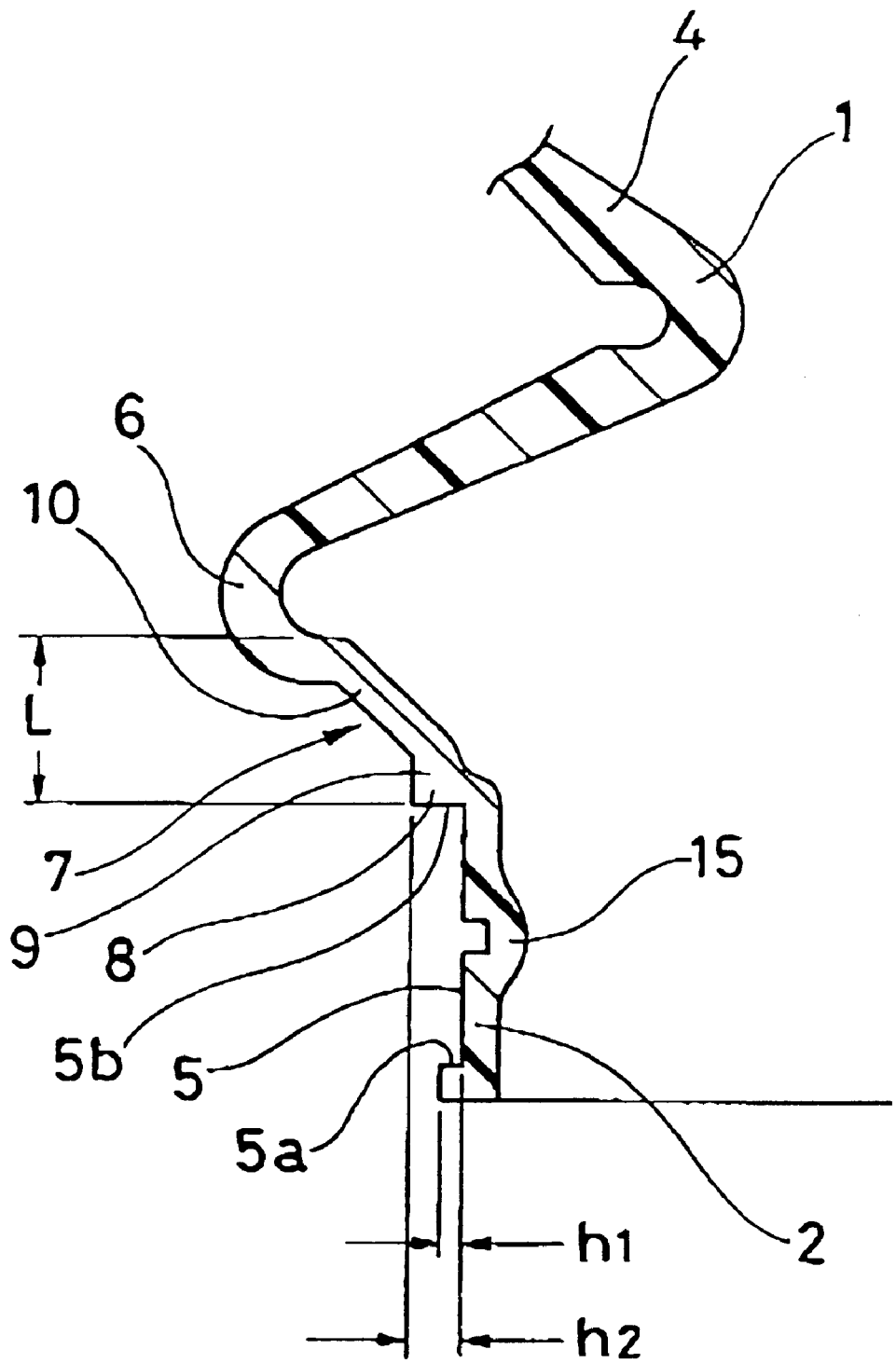
FIG. 5 is a cross sectional view showing a main portion of a boot according to a fourth embodiment of the present invention.

As is shown in FIG. 5, reference numerals are the same in FIGS. 1, 2, 3 and 4. The third embodiment is similar to the first and second embodiment except for the shape of the enlarged portion 10.

In the spacer portion 7, the enlarged portion 10 is integrally molded into a tapered shape in a slanting direction outwardly from the small-diameter side of the rising-up portion 9, and the shape of this enlarged portion 10 is formed into an approximately straight-line in cross section (in FIG. 5). The arcuate portion of the relief portion 6 is consecutively and directly connected to the enlarged portion 10 and is bulged out in a radially outward direction of the boot. The peripheral diameter of the annular relief portion 6 is larger than that of the small-diameter-side end of the enlarged portion 10. Deformation of the boot when the boot is bent, is also similar to the first to third embodiments as described above.

Fifth embodiment

Figure 6:
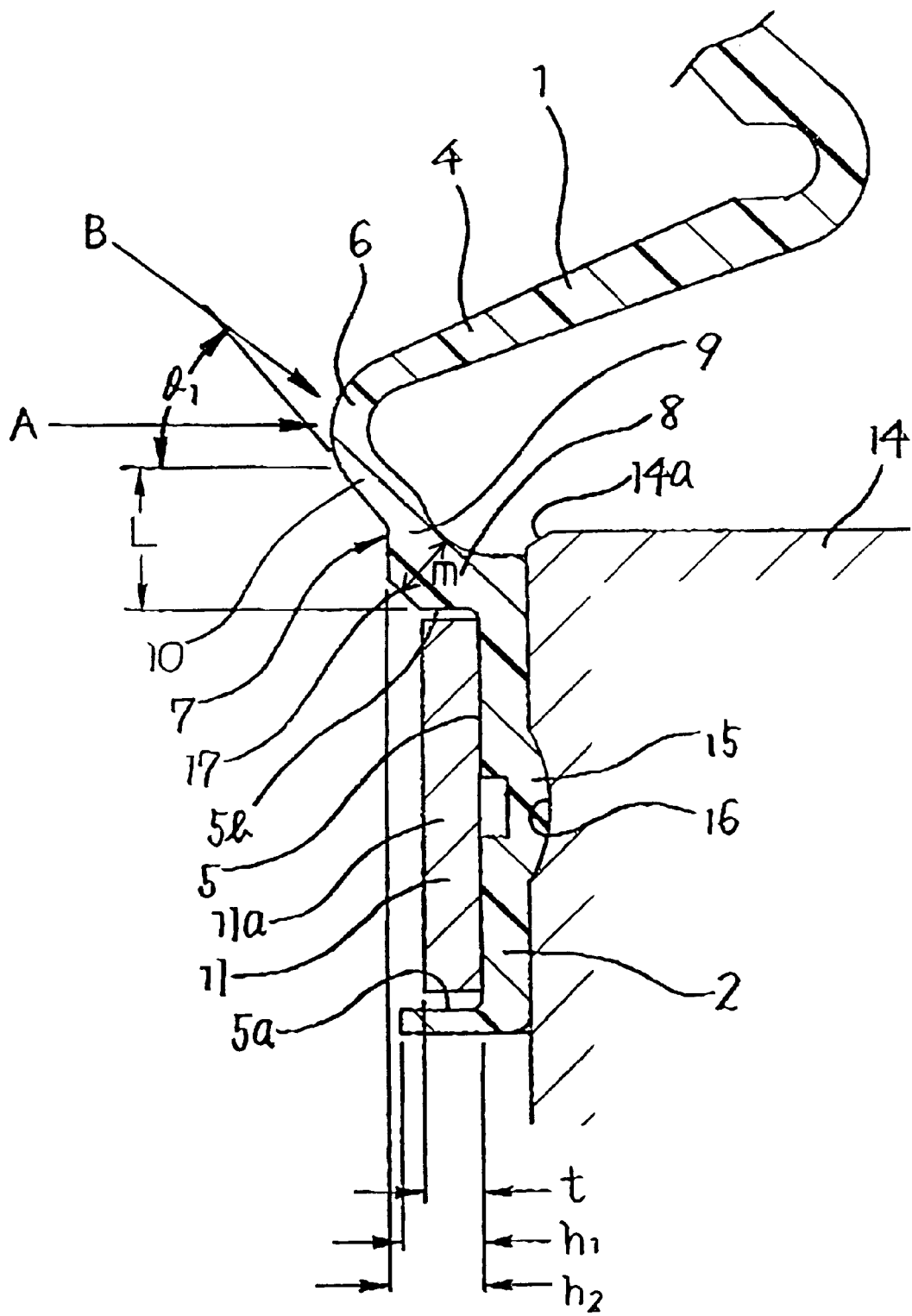
FIG. 6 is a cross sectional view showing a main portion of a boot according to a fifth embodiment of the present invention.
Figure 7:
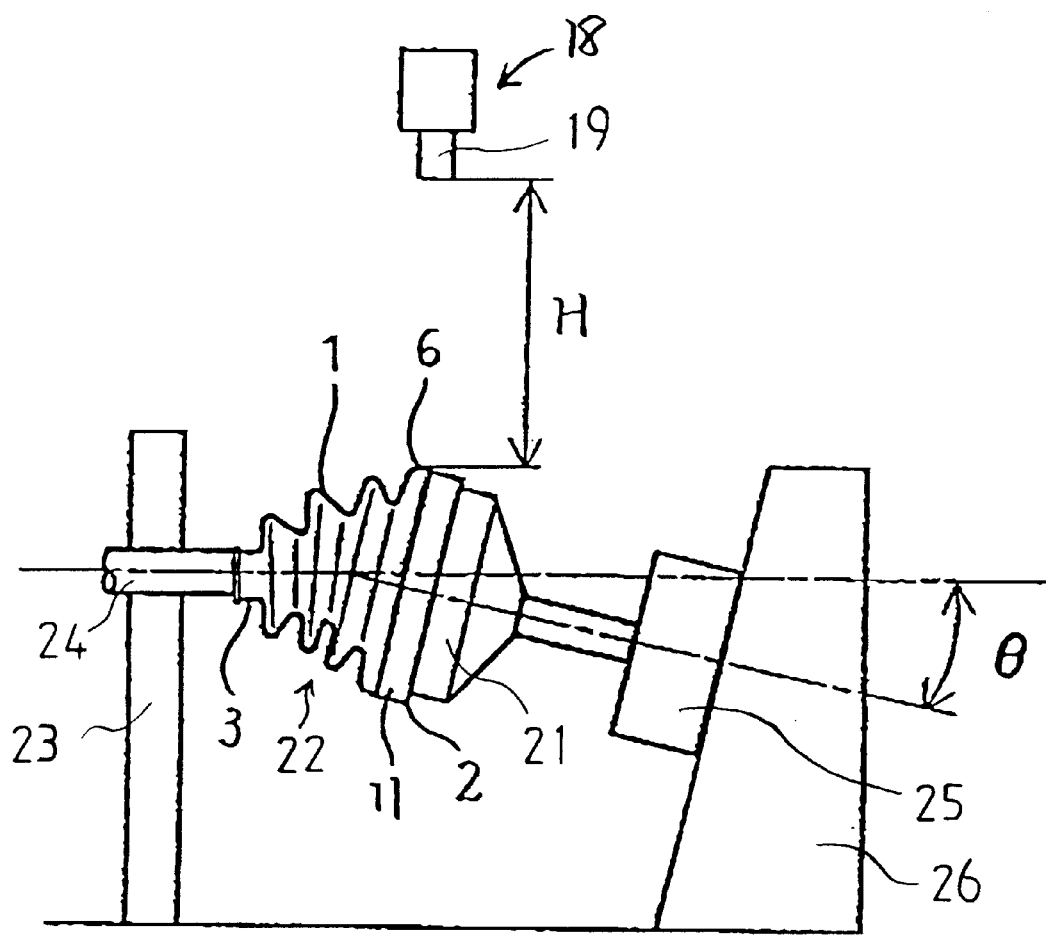
FIG. 7 is a schematic view of the impact testing of the present invention.

As shown in FIG. 6, the same reference numerals are used as in FIGS. 1, 2, 3, 4 and 5, except for some numerals. The large-diameter side portion of the radially outwardly end portion of the tubular thrust portion 8 is chamfered. When the boot is made by blow molding, a parison is enlarged and pressed toward the wall of the mold by air or the like. The thickness of the molded material tends to become thin in thickness at the place there is a concave portion (outwardly bulge portion) in the mold. Chamfered portion 17 is disposed at the large-diameter side portion of the radially outward end portion of the thrust portion 8 in this embodiment, so that the thickness m in FIG. 6 can be large.

Therefore, the stiffness of the portion 9 becomes greater. In the case when there is a impact (impact direction from A or B in FIG. 6) in the vicinity of the annular relief portion 6 of the boot, the boot is difficult to impinge on to the outer ring portion (14, 14a) of the universal joint, because the portion 9 is difficult deform due to the higher in stiffness in the portion 9. Thereby it is possible to prevent the boots from damage or tear by inadvertent impact on the boots. The chamfered length m is preferably in the range of about 0.2 mm to about 1.5 mm. Table 1 shows test results of the free fall drop impact test. The boots having chamfered length m (1 mm in length) and the spacer portion, and the boot having no chamfered and no spacer portion, were tested.

TABLE 1

Free Fall Drop Impact Test

Figure 8:
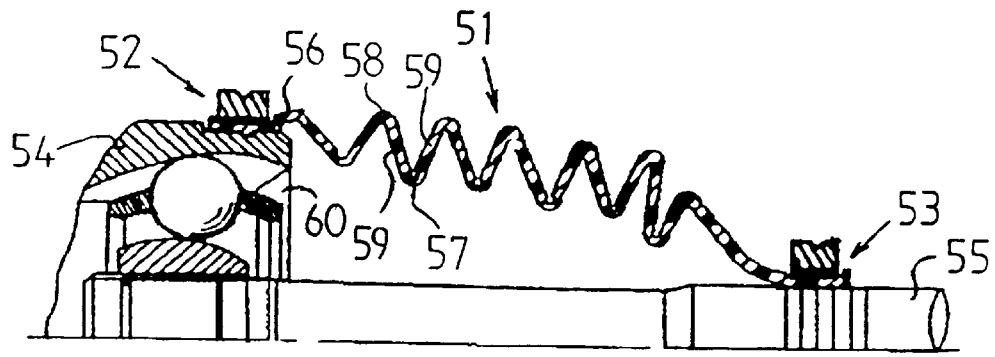
FIG. 8 is a half-cut cross sectional view showing a boot of the prior art.
Figure 9:
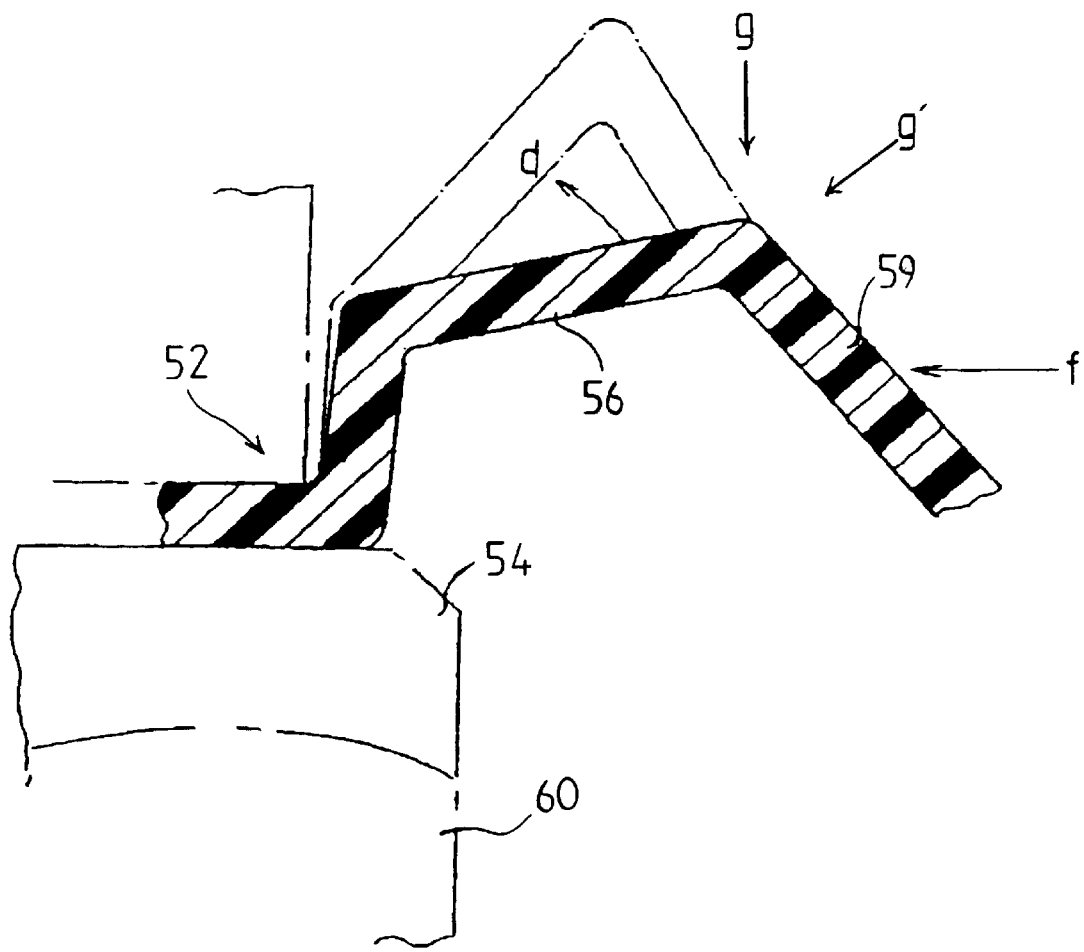
FIG. 9 is a cross sectional view showing a main portion of the boot of a prior art.

| Tilting angle θ in FIG. 8 | Fracture mode | Ratio of increase in the height of free fall (%) *) |
|---|---|---|
| 40 degree | Penetrating tear | 125 |
|  | Non-penetrating tear | 175 |
| 0 degree | Penetrating tear | 100 (no improvement) |
|  | Non-penetrating tear | 120 |

*) the ratio of the height of free fall (%) = H2/H1 × 100,
H1: maximum height which does not cause tear in boots having chamfered portion and the spacer portion
H2: maximum height which does not cause tear in boots having no chamfered portion FIG. 8 shows a schematic view of the free fall drop impact test. The test was conducted in static condition. The temperature was at room temperature. The weight of the falling weight 18 was 1 Kg. The shape of the tip 19 of the falling weight 18 was in the shape of a cylinder having a diameter of 20 mm protruding from the weight body 18. The falling weight 18 was laid over the boot to be tested and fell down aiming at the relief portion 6. Universal joint 21 was mounted by the larger-diameter-side fitting portion 2 of the boot 22 having a total length of about 120 mm. An inner diameter of the large-diameter side fitting portion was about 92 mm and the inner diameter of the small-diameter side fitting portion 3 was about 30 mm. The boot was fitted on the universal joint 21 and the driven shaft: 24. The driven shaft 24 is supported by supporting member 23. The universal joint 21 is supported by another support member 25 and 26.

Two kinds of tests, namely 0 degree and 40 degree of bending angle θ were performed. Tear was observed by visual observation. Test results are described in Table 1. Table 1 shows that the boots having a chamfered portion have an excellent impact durability except for a penetrating tear at 0 degrees.

EFFECT OF THE INVENTION

In the boot for the universal joint according to the present invention having the above-mentioned construction, since the spacer portion having the predetermined length in the axial direction of the boot is provided between the fitting portion and the relief portion, the relief portion is arranged more remotely from the clamp portion by the length of this spacer portion. Therefore, even when the relief portion slants in the compression side toward the clamping portion when the boot is bent, the relief portion does not easily reach to the tightly-clamping portion of the clamp, thereby it is possible to prevent the relief portion from interfering with the tightly-clamping portion. Therefore, it is possible to prevent the relief portion 6 and the mountainous portion of the bellows from interfering with the tightly-clamping portion, thereby the damage caused by interfering between the relief portion or the mountainous portion and the tightly clamping portion or the band portion of the clamp, can be effectively avoided. Moreover, since the relief portion is provided between the bellows portion and the fitting portion, the interference between the bellows and the shaft or the opening of the universal joint is reduced, even in the case where the boot is bent sharply.

According to the present invention, the relief portion has an arcuate or half round shape in cross section, so that the arcuate shape can open and close somewhat easily like a scissors with expansion and contraction of the bellows portion. The arcuate portion also has a half round shape so that it can absorb, to some degree, the stress added to the bellows. Thereby the relief portion acts like a buffer to absorb deformation of the boot when the boots is bent.

In the boot for the universal joint according to the present invention having the above-mentioned construction, since the relief portion is directly connected to the slanting portion of the trough portion of the bellows, it is effectively prevents the first trough portion, which is connected directly through its slanting portion, from contacting with the opening portion of the universal joint. This is because, when the boot is bent, the spacer portion slants toward the clamping portion, to bring the first trough portion to a place more remote from the opening portion. Due to the first large-diameter-side mountainous portion placed next to the trough portion, the first large-diameter-side mountainous portion is disposed far from the clamp portion, thereby it is possible to prevent the mountainous portion from interfering with the clamping portion.

Moreover, in addition to this effect, in the boot for the universal joint according to the present invention provided with the above-mentioned construction, the spacer portion comprises the thrust portion provided with the side wall having the height higher than the thickness of the band of the clamp means; the rising-up portion molded integrally with the thrust portion and connected to the end portion of the periphery of the thrust portion; and the enlarged portion, molded integrally with the rising-up portion, extends from the small-diameter-side end the rising-up portion toward the slantingly or radially outward direction. As a result, the relief portion and the mountainous portion of the bellows can not interfere with the clamp portion and increase the durablity of the boot in use.

Moreover, the height of the side wall of the bellows side in the groove-like recess for fitting the clamp is set higher than the thickness of the band of the clamp means, and also the enlarged portion is extended slantingly or in a radially outward direction, thereby the relief portion is arranged in a considerably radially outward direction. Therefore, even when the relief portion falls down, the relief portion is not frequently met with the tightly-clamping portion of the clamp, thereby it is also possible to prevent the relief portion 6 from interfering with the tightly-clamping portion.

According to the present invention, the stiffness at the portion of the junction between the thrust portion and the rising-up portion is set higher by chamfering, so that even when the impact is added to the portion in the vicinity of the large-diameter side, the tear resistance by the impact can be largely improved by providing a chamfered portion in the radially outward portion of the large-diameter side of the thrust portion.

What is claimed is:

1. A boot for a universal joint comprising:
   a bellows comprising a ridge portion, a trough portion and a slanting portion;
   an annular fitting portion provided on a large-diameter side of said boot;
   an annular relief portion connected to said bellows and placed between said bellows and said fitting portion; and
   an annular spacer portion connected and placed between said annular relieve portion and said annular fitting portion;
   said relief portion being connected to said slanting portion and said slanting portion extending from said relief portion to said trough portion, said trough portion being located adjacent to said relief portion and said trough portion having an outer diameter less than an outer diameter of said annular fitting portion.

2. The boot for the universal joint according to claim 1, wherein said spacer portion comprises:
   a substantially tubular thrust portion connected to said annular fitting portion; and
   an annular rising portion connected to said thrust portion, and placed between said thrust portion and said relief portion.

3. The boot for the universal joint according to claim 2, wherein a larger-diameter side outer peripheral corner of a radially outward portion of said thrust portion is chamfered.

4. The boot for the universal joint according to claim 1, wherein said spacer portion comprises:
   a substantially tubular thrust portion connected to said annular fitting portion; and
   an annular rising-up portion connected to said thrust portion, and placed between said thrust portion and said relief portion; and
   a substantially frustoconical enlarged portion, an inner and an outer diameter of said enlarged portion being greater than the large-diameter side of the boot and a small-diameter side of the boot, said enlarged portion is connected to both said rising-up portion on the large-diameter side and said relief portion on the small-diameter side.

5. The boot for the universal joint according to claim 4, wherein an angle between a direction of enlargment of said enlarged portion and a radial direction of said boot is smaller than an angle between a direction of said slanting portion of said bellows extending from said trough portion to a side of the smaller-diameter portion and the radial direction of said boot.

6. The boot for the universal joint according to claim 4, wherein the enlarged portion includes an arcuate shape in cross section.

7. The boot for the universal joint according to claim 4, wherein the enlarged portion includes a substantially straight line in cross section.

* * * * *